US012269726B2

(12) United States Patent
Landler

(10) Patent No.: US 12,269,726 B2
(45) Date of Patent: Apr. 8, 2025

(54) MACHINE BLOCK AND METHOD FOR FILLING BOTTLES WITH LIQUID PRODUCTS

(71) Applicant: KRONES AG, Neutraubling (DE)

(72) Inventor: Bruno Landler, Neutraubling (DE)

(73) Assignee: KRONES AG, Neutraubling (DE)

(*) Notice: Subject to any disclaimer, the term of this patent is extended or adjusted under 35 U.S.C. 154(b) by 55 days.

(21) Appl. No.: 18/252,521

(22) PCT Filed: Oct. 21, 2021

(86) PCT No.: PCT/EP2021/079195

§ 371 (c)(1),
(2) Date: May 10, 2023

(87) PCT Pub. No.: WO2022/106141

PCT Pub. Date: May 27, 2022

(65) Prior Publication Data

US 2023/0416067 A1 Dec. 28, 2023

(30) Foreign Application Priority Data

Nov. 17, 2020 (DE) ..................... 10 2020 130 324.6

(51) Int. Cl.
*B67C 7/00* (2006.01)

(52) U.S. Cl.
CPC ............ *B67C 7/002* (2013.01); *B67C 7/0013* (2013.01)

(58) Field of Classification Search
CPC .............................. B67C 7/0013; B67C 7/002
See application file for complete search history.

(56) References Cited

U.S. PATENT DOCUMENTS

2007/0056251 A1* 3/2007 Ruppman ............... B67C 3/222 53/512
2018/0170738 A1* 6/2018 Landler ................. B67C 7/0053
2019/0031380 A1 1/2019 Hroncheck
2022/0411249 A1* 12/2022 Till ......................... B67C 3/007

FOREIGN PATENT DOCUMENTS

DE 102018132608 A1 6/2020
EP 3514105 A1 7/2019
JP 2009184686 A * 8/2009 ............... B65B 3/04

OTHER PUBLICATIONS

ISA European Patent Office, International Search Report Issued in Application No. PCT/EP2021/079195, Feb. 23, 2022, WIPO, 4 pages.

* cited by examiner

*Primary Examiner* — Andrew M Tecco
*Assistant Examiner* — Nicholas E Igbokwe
(74) *Attorney, Agent, or Firm* — McCoy Russell LLP

(57) ABSTRACT

A machine block and a method for filling bottles with liquid products, in particular beverages, are described. Accordingly, at least a first and second filler of circulating design with infeed starwheels and outfeed starwheels are provided. Filling can take place with a small amount of required space and comparatively low machine output in that the empty bottles are alternatingly removed from a transport path which runs linearly at least in some portions and supplied by means of the infeed starwheels to the first and second fillers interlocking with said transport path, and the bottles thus filled are transferred again to the transport path into transport gaps produced between the bottles during removal.

18 Claims, 3 Drawing Sheets

MACHINE BLOCK AND METHOD FOR FILLING BOTTLES WITH LIQUID PRODUCTS

CROSS REFERENCE TO RELATED APPLICATIONS

The present application is a U.S. National Phase of International Application No. PCT/EP2021/079195 entitled "MACHINE BLOCK AND METHOD FOR FILLING BOTTLES WITH LIQUID PRODUCTS," and filed on Oct. 21, 2021. International Application No. PCT/EP2021/079195 claims priority to German Patent Application No. 10 2020 130 324.6 filed on Nov. 17, 2020. The entire contents of each of the above-listed applications are hereby incorporated by reference for all purposes.

TECHNICAL FIELD

The invention relates to a machine block according to the preamble of claim 1 and a method for filling bottles with liquid products.

BACKGROUND AND SUMMARY

Machine blocks, for example with a blow molder, labeling machine, a filler and a closer, are known to be suitable for the space-saving filling of bottles with liquid products, for example beverages, with comparatively high machine outputs (containers per unit of time). The fillers incorporated in such machine blocks have generally shown themselves to be restrictive in the maximization of machine performance. Since the filling process cannot be shortened at will, fillers with a comparatively large number of circulating filling stations and therefore a comparatively large diameter are needed to maximize output. Alternatively, the flow of bottles to be filled can be divided into parallel partial flows which are then each fed to separate fillers and then recombined. However, this requires comparatively complex technical measures.

It has also been found that the frequent changes in direction of the bottles during transport in transfer and/or distribution starwheels can be disadvantageous, above all before the bottles are closed, since the liquid with which they are filled is then still sloshing back and forth, and this hinders the addition of inert gas into the head space above the liquid.

There is therefore a need for a machine block and a method for filling bottles with liquid products with which at least one of the above-mentioned problems can be eliminated or at least reduced.

The stated object is achieved with a machine block according to claim 1 and with a method according to claim 9.

The machine block therefore serves to fill bottles with liquid products, in particular beverages, and for this purpose comprises at least one first and one second filler of a circulating design, each having an infeed starwheel and an outfeed starwheel.

According to the invention, the machine block comprises a transport path for the bottles which runs linearly along the infeed and outfeed starwheels, wherein the infeed starwheels are designed, viewed in the transport direction, to alternatingly take the bottles from the transport path and transfer them to the associated fillers. The outfeed starwheels are designed to return the bottles filled on the associated filler to the transport path in transport gaps produced while being taken by the associated infeed starwheel.

An alternating transfer of bottles from the transport path, viewed in the direction of transport, means that when there are two fillers, every second incoming bottle is taken by the infeed starwheels, with three available fillers every third incoming bottle, etc. In each case, this creates a transport gap in the bottle stream, which is then immediately occupied with a bottle filled there at the outfeed starwheel of the same filler.

This enables a single-track bottle flow in the region of the transport path and a sequential arrangement of the fillers relative to the transport path assigned thereto.

It is therefore unnecessary to divide the bottle stream into partial flows running in parallel before filling, and to recombine it after filling. Instead, the bottles temporarily leave the transport path to be filled in one of the fillers and bypass the other filler or, if appropriate, all of the other fillers on the transport path arranged along the transport path.

This allows a comparatively compact sequential arrangement of the fillers in the machine block, viewed in the direction of transport of the transport path. Furthermore, the bottles can only be distributed to the fillers by means of the infeed starwheels and outfeed starwheels without the aid of additional distributing starwheels or the like. As a result, the overall outlay in equipment for guiding the bottle flow can be minimized.

In addition, the linearly extending transport path enables an output-side transport section in which the bottles are not subjected to any change of direction, so that liquid added therein can be calmed before subsequent application with inert gas and/or before the closing, i.e. excessive sloshing of the added liquid in the bottles can be avoided.

A linear course of the transport path along the infeed starwheels and outfeed starwheels is to be understood to mean that the transport path extends linearly at least immediately before and after the transfer and return of the bottles to the infeed starwheels and outfeed starwheels, that is to say in the region of the respective transfer point.

That means that at the respective transfer points between the transport path and the infeed and outfeed starwheels, the substantially curved movement paths of the bottles in the infeed and outfeed starwheels and the rectilinear movement paths of the bottles transition into one another on the transport path.

Preferably, the axes of rotation of all infeed starwheels and outfeed starwheels are arranged along a straight line running parallel to the transport path. This enables a particularly advantageous machine block in terms of design in which the transport path along all infeed starwheels and outfeed starwheels always runs linearly, and infeed starwheels and outfeed starwheels of a uniform construction and with corresponding circle segments can be used in a rectilinear arrangement. As a result, the equipment outlay for drives and control elements in the infeed starwheels and outfeed starwheels and holders for the bottles can be minimized.

Preferably, the infeed starwheels and outfeed starwheels between an inner circle segment and an outer circle segment comprise controlled extendable and/or pivotable bottle clamps. This means that the transport spacing of the infeed starwheels and outfeed starwheels can be adapted comparatively easily to the transport spacing of the filler, on the one hand, and to a transport spacing required to take every second (or, if necessary, every third) bottle and return it to the transport gaps created on the transport path, on the other hand.

Preferably, the bottle clamps are then movably arranged on the infeed starwheels and outfeed starwheels such that the respective transport spacing between the bottles on the outer circle segment is twice as large as on the inner circle segment, and/or the transport spacing of the bottles on the outer circle segment is twice as large as on the transport path.

This simplifies taking the empty bottles from each second transport position of the transport path at successive transport positions of the entry starwheels, transferring the bottles to the filler, and returning the filled bottles in the outfeed starwheel to the created transport gaps.

For the transfer, the bottles then preferably run to the associated filler on the inner circle segment and at the common transfer point with the transport path on the outer circle segment.

The infeed starwheels and the outfeed starwheels are then synchronized with the transport path in such a way that each second transport position of the transport path coincides with the infeed starwheel and the outfeed starwheel of the respective filler, that is, for example, all odd transport positions on the transport path with the transport positions of the infeed starwheel and the outfeed starwheel of the first filler, and all even transport positions of the transport path with all transport positions of the infeed starwheel and outfeed starwheel of the second filler.

As a result, the number of necessary relative movements between transfer elements on the infeed starwheels and outfeed starwheels as well as on the transport path can be minimized, and therefore also the effort for synchronizing and controlling the bottle clamps.

The transport path preferably comprises a circulating transport means and neck clamps that are fastened thereto for a neck region of the bottles and body clamps for a body region of the bottles. The neck clamps and body clamps can then be designed as passive bottle clamps. The circulating transport means is preferably designed as a roller-guided chain with chain links which each carry a body clamp and a neck clamp.

Preferably, the machine block further comprises a closer of a circulating design, which is interlocked with the fillers and is connected to the last outfeed starwheel upstream thereof by means of a linear transport section of the transport path in such a way that it tangentially adjoins a circle segment of the outfeed starwheel and the circle segment of the closer.

This enables a consistently linear connection path between the last upstream outfeed starwheel and the closer, so that sloshing of the previously added liquid can be reduced and/or essentially comes to a standstill. Consequently, the headspace of the bottles above the added liquid can be treated more easily and reliably by supplying inert gas.

Preferably, the machine block comprises an inert gas dropper arranged in the linear transport section between the closer and the outfeed starwheel last upstream therefrom. Due to a calming of the added liquid by reducing lateral movements of the bottles, an inert gas treatment can be carried out particularly efficiently using droppers.

Preferably, the transport means of the transport path runs around the closer. In other words, the transport path in the region of the closer then runs along the circle segment of the closer for the bottles. In particular, the transport means then also transports the bottles during closing.

This enables a particularly simple and space-saving integration of the transport path into the machine block.

The method according to the invention serves to fill bottles with liquid products, in particular beverages. In the method, the empty bottles are alternatingly taken from a transport path at a first linear transport section by a first infeed starwheel and at a second linear transport section following in the transport direction by a second infeed starwheel, and always transferred to a filler of a circulating design that interlocks with the transport section. The bottles filled there are each returned to the transport path by means of an outfeed starwheel by placing the bottles in transport gaps produced between the bottles in the associated infeed starwheel. The advantages described with respect to the device according to the invention can therefore be achieved.

Preferably, the bottles are transported on the transport path always in a single lane, and between the first and second filler as a mixed bottle stream with empty and filled bottles. This avoids complex dividing and recombining the bottle flow for a parallel connection of the fillers.

Preferably, bottle clamps formed on the infeed starwheels and outfeed starwheels are moved back and forth in a controlled manner between an inner circle segment for bottle transfer on the filler, and an outer circle segment to take the empty bottles from the transport path or return the filled bottles to the transport path. This makes it possible to adapt the transport spacing of the infeed starwheels and outfeed starwheels to the respective filler and to the transport path comparatively easily in terms of equipment.

Preferably, the bottle clamps are moved to the outside in a controlled manner for taking and returning the bottles on the transport path such that the transport spacing between the bottle clamps of the infeed starwheels and the outfeed starwheels is twice as great there as the transport spacing of the transport section. This enables successive transport positions of the infeed starwheels and outfeed starwheels to be easily synchronized with each second transport position of the transport section.

Preferably, the bottles are held aloft in the region of the transport path, in particular both in neck regions and in the body regions of the bottles. This enables a stable and orthogonal orientation of the bottles for the respective takeover or return. The bottles can be held in the region of the transport path by means of passive clamps.

Preferably, the bottles are consistently transported linearly between the outfeed starwheels and a downstream closer. This serves to reduce sloshing movements of the liquid added to the bottles, for example for adding inert gas to the bottles above the added liquid. Preferably, inert gas is applied internally in the bottles.

Preferably, at least 80,000 bottles per hour are transported on the transport path. The method can then be used particularly advantageously, for example for efficiently adding uncarbonated beverages such as uncarbonated water. The method can also be used for CSD beverages. It would then also be conceivable for the two fillers to add different products. Two types can therefore be produced simultaneously with the machine block, but each individual type with reduced output.

Alternatively, it can also be provided that the interconnected machines are not arranged in the sequence of "blow molder, labeling machine, filler," but in the sequence of "blow molder, filler, labeling machine."

BRIEF DESCRIPTION OF THE FIGURES

A preferred embodiment of the invention is shown in a drawing. In the drawings.

DETAILED DESCRIPTION

Figure 1:
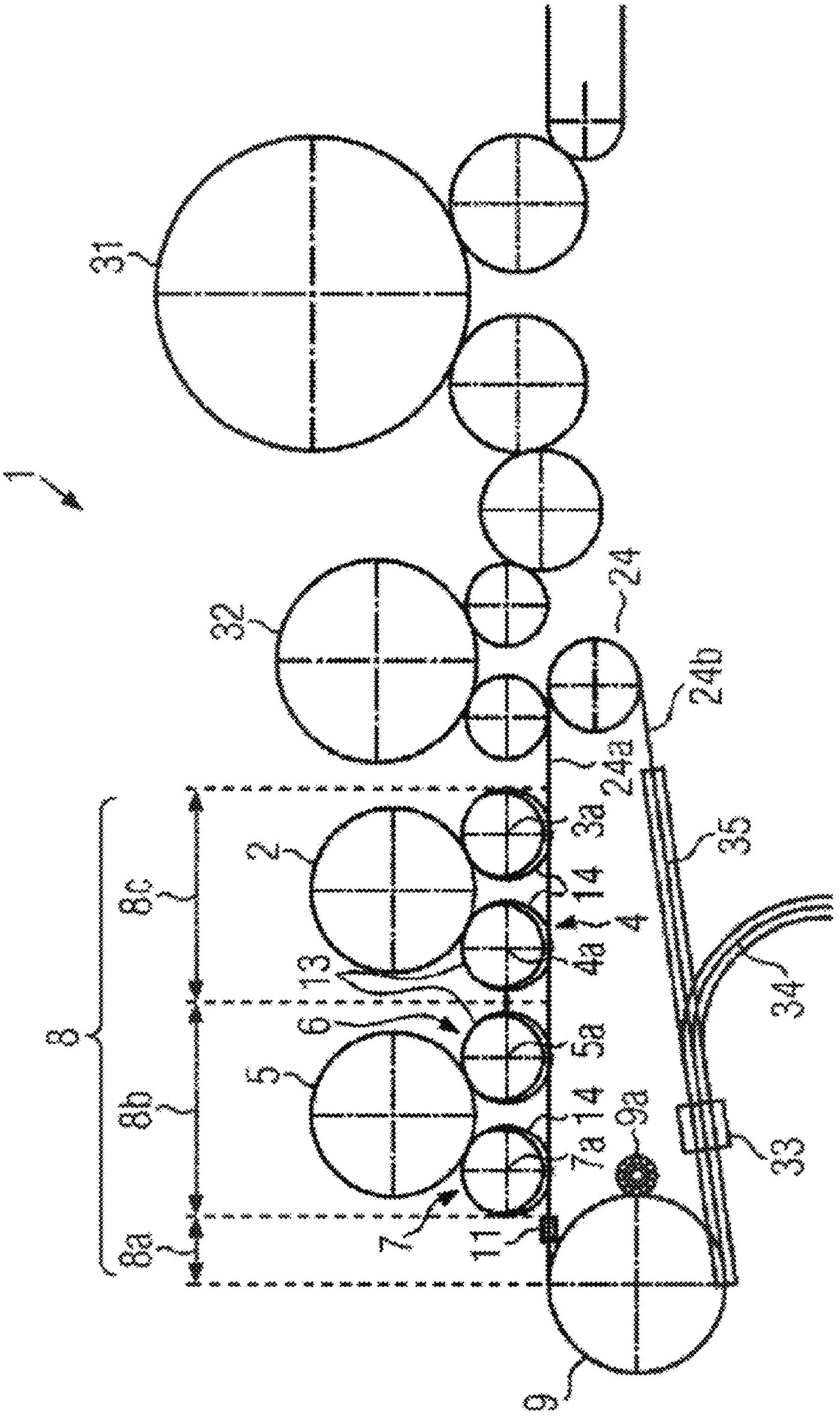
FIG. 1 shows a schematic plan view of a machine block.

As can be seen in FIG. 1 in the schematic plan view, in a preferred embodiment, the machine block 1 comprises a first filler 2 with a first infeed starwheel 3 and a first outfeed starwheel 4, and a second filler 5 with a second infeed starwheel 6 and a second outfeed starwheel 7. Associated with these are a transport section 8 with a first linear transport section 8*a* in the region of the first infeed starwheel 3 and the first outfeed starwheel 4, a second linear transport section 8*b* in the region of the second infeed starwheel 6 and the second outfeed starwheel 7 and a third linear transport section 8*c* in the region between the second outfeed starwheel 7 and a closer 9 connected downstream from the fillers 2, 5.

The first and second fillers 2, 5 are arranged sequentially along the common transport path 8 with respect to the transport direction 10 of the transport path 8, and are therefore supplied sequentially in this regard.

Preferably, the transport path 8 runs consistently linearly from the region of the first infeed starwheel 3 to the closer 9.

In principle, however, it would also be conceivable to change the transport direction 10 in the region of the transport path 8, namely between the first and second transport sections 8*a*, 8*b* and/or between the second and third transport sections 8*b*, 8*c*. For example, a machine block 1 would be possible in which the transport path 8 between the first and second transport sections 8*a*, 8*b* has a 90° arc (not shown).

As can be seen by way of example in FIG. 1, the axes of rotation 3*a*, 6*a*, 4*a*, 7*a* of the infeed starwheels 3, 6 and the outfeed starwheels 4, 7 are preferably arranged along a straight line running parallel to the transport path 8.

An inert gas dropper 11, in particular an $N_2$ dropper, is preferably arranged in the linearly extending third transport section 8*c*. The linear course of the third transport section 8*c* promotes the suppression of undesired sloshing movements of a liquid (not shown) added by the fillers 2, 5 to bottles 12 (see FIG. 2).

This effect can be facilitated by the fact that the transport direction 10 of the bottles 12 in the third transport section 8*c* tangentially adjoins the movement paths of the bottles 12 at the second outfeed starwheel 7 and at the closer 9. Lateral movements of the bottles 12 can therefore be avoided between the second outfeed starwheel 7 and the closer 9. The added liquid can therefore be calmed in the bottles 12 in the desired manner before reaching the inert gas dropper 11.

FIG. 1 schematically shows that the bottles 12 on the infeed starwheels 3, 6 and outfeed starwheels 4, 7 run along an inner circle segment 13 in regions facing the respective filler 2, 5, and along a movement path 14 offset outward with respect to the inner circle segment 13 in regions facing the transport section 8.

Figure 2:
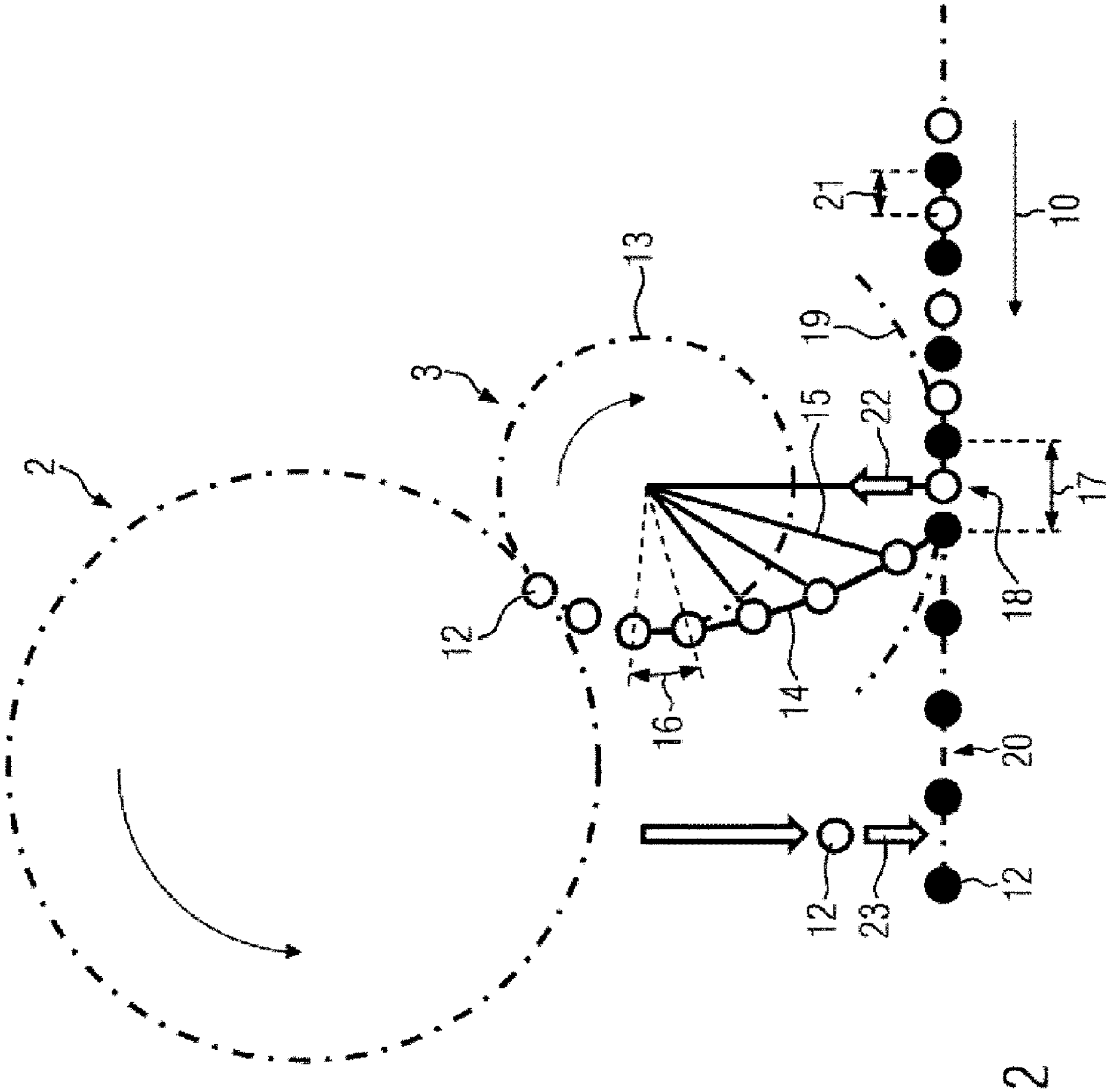
FIG. 2 shows a schematic plan view of the transfer region between the transport path and an infeed starwheel.

As indicated in FIG. 2 for simplicity only with the first infeed starwheel 3 (and in principle representative of the second infeed starwheel 6 and the outfeed starwheels 4, 7), the bottles 12 can be displaced in a controlled manner from the inner circle segment 13, in particular radially outward with respect to the axes of rotation 3*a*, 4*a*, 6*a*, 7*a* (not shown) onto the path of movement 14 and back again (shown), as is known in principle from so-called sliding starwheels and therefore not explained in detail.

The bottles 12 are held on the infeed starwheels 3, 6 and outfeed starwheels 4, 7 by preferably actively gripping bottle clamps 15. These can be positioned and actuated by means of cam control in a manner known in principle. Controlled pivoting movements of the bottle clamps 15 are also conceivable in order to guide the bottles 12 along the movement path 14 offset with respect to the circle segment 13, or also a combination of pushing and pivoting the bottle clamps 15.

By offsetting the bottles 12 towards the outside, a first transport spacing 16 on the inner circle segment 13 increases successively in the region of the respective filler 2, 5 in the direction of rotation (arrow) up to a second transport spacing 17 in the region of a transfer point 18 for the bottles 12 in common with the transport path 8, in order to decrease afterward in the circumferential direction.

The second transport spacing 17 can be assigned to an outer circle segment 19 of the infeed starwheels 3, 6 and outfeed starwheels 4, 7 running through the respective transfer point 18, which is indicated schematically in FIG. 2. That is to say, the movement paths 14 each run sectionally up to and between the inner and outer circle segments 13, 19.

This serves to take only every second empty bottle 12 passing along the transfer point 18 with a bottle clamp 15 of the first or second infeed starwheel 3, 6 and to insert the bottles 12 filled at the associated filler 2, 5 into transport gaps 20 created in this way on the transport path 8 by means of the associated outfeed starwheel 4, 7.

The transport gaps 20 exist only between the infeed starwheel 3, 6 and outfeed starwheel 4, 7 of the respective filler 2, 5.

As can be seen in FIG. 2, the bottles 12 run directly in front of the infeed starwheels 3, 6 as an equidistant bottle flow with always occupied transport positions in a straight line to the respective transfer point 18. For clarification, the bottles 12 at odd transport positions in the bottle flow are shown as white-filled circles, whereas the bottles 12 at an even transport position are circles filled with black.

Without the transport gaps 20, the bottle flow on the transport path 8 has a third transport spacing 21, which is preferably identical to the first transport spacing 16.

By means of, for example, mechanically controlled displacement (shown) transversely to the direction of circulation (arrow) and/or pivoting (not shown) of the bottle clamps 15 in or opposite the direction of circulation, they are guided along the movement path 14. This is shown not to scale in FIG. 2 only for the region of the picked up empty bottles 12 and the reduction of the second transport spacing 17 to the first transport spacing 16 for basic clarification.

When the empty bottles 12 are transferred 22 to the respective infeed starwheels 3, 6, the transport gaps 20 occur between every second bottle 12, in the shown example between the bottles 12 with an even transport position which continue on the transport path 8 unaffected by the first infeed starwheel 3.

The transport path 8 and the fillers 2, 5 with their infeed starwheels 3, 6 and outfeed starwheels 4, 7 are synchronized with one another in such a way that the return 23 of the bottles 12 filled there is carried out by the respective outfeed starwheel 4, 7 back to the transport path 8 into the transport gaps 20 which are created directly beforehand.

The return 23 of the filled bottles 12 by the outfeed starwheels 4, 7 to the transport path 8 is carried out in principle in the same way as is shown with respect to the transfer 22 of the empty bottles 12 at the first infeed starwheel 3, but only with a reverse change of transport spacing. That is to say, the filled bottles 12 initially run along the inner circle segment 13 with the first transport spacing 16 and then along the movement path 14 up to the return 23 with the second transport spacing 17. The return 23 is indicated in FIG. 2 for the sake of simplicity only in the form of a block arrow.

The transfer 22 of the empty bottles 12 to the second infeed starwheel 6 and the subsequent return 23 of the bottles 12 filled at the second filler 5 back to the transport path 8 into transport gaps 20 generated immediately beforehand is performed in the same way as has been described with respect to the first infeed starwheel 3 and the first outfeed starwheel 4. The only difference is that just the containers 12 shown in black in FIG. 2 with the even transport position are transferred to the second filler 5 and filled therein, while the bottles 12 already filled at the first filler 2 pass by unaltered, and the transport gaps 20 are temporarily generated between them.

The second transport spacing 17 of the infeed starwheels 3, 6 and the outfeed starwheels 4, 7 is preferably twice as large as the third transport spacing 21 of the transport path 8, and preferably also twice as large as the first transport spacing 16 in the region of the fillers 2, 5. This simplifies the synchronization of the involved drives during the transfer 22 and the return 23 between each second transport position on the transport path 8 and the directly successive transport positions of the infeed starwheels 3, 4 and outfeed starwheels 6, 7.

The first and/or third transport spacing 16, 21 is, for example, 80 to 120 mm, and the second transport spacing 17 then corresponding to 160 to 240 mm.

In principle, it would also be conceivable to arrange another filler with an infeed starwheel and outfeed starwheel along the transport path 8 and then only sequentially fill each third bottle 12 from the transport path 8 in one of the existing fillers (not shown). As a rule, however, the described distribution of the bottles 12 to two fillers 2, 5 enables a particularly practical adaptation of individual machine outputs to each other in the machine block 1.

Figure 3:
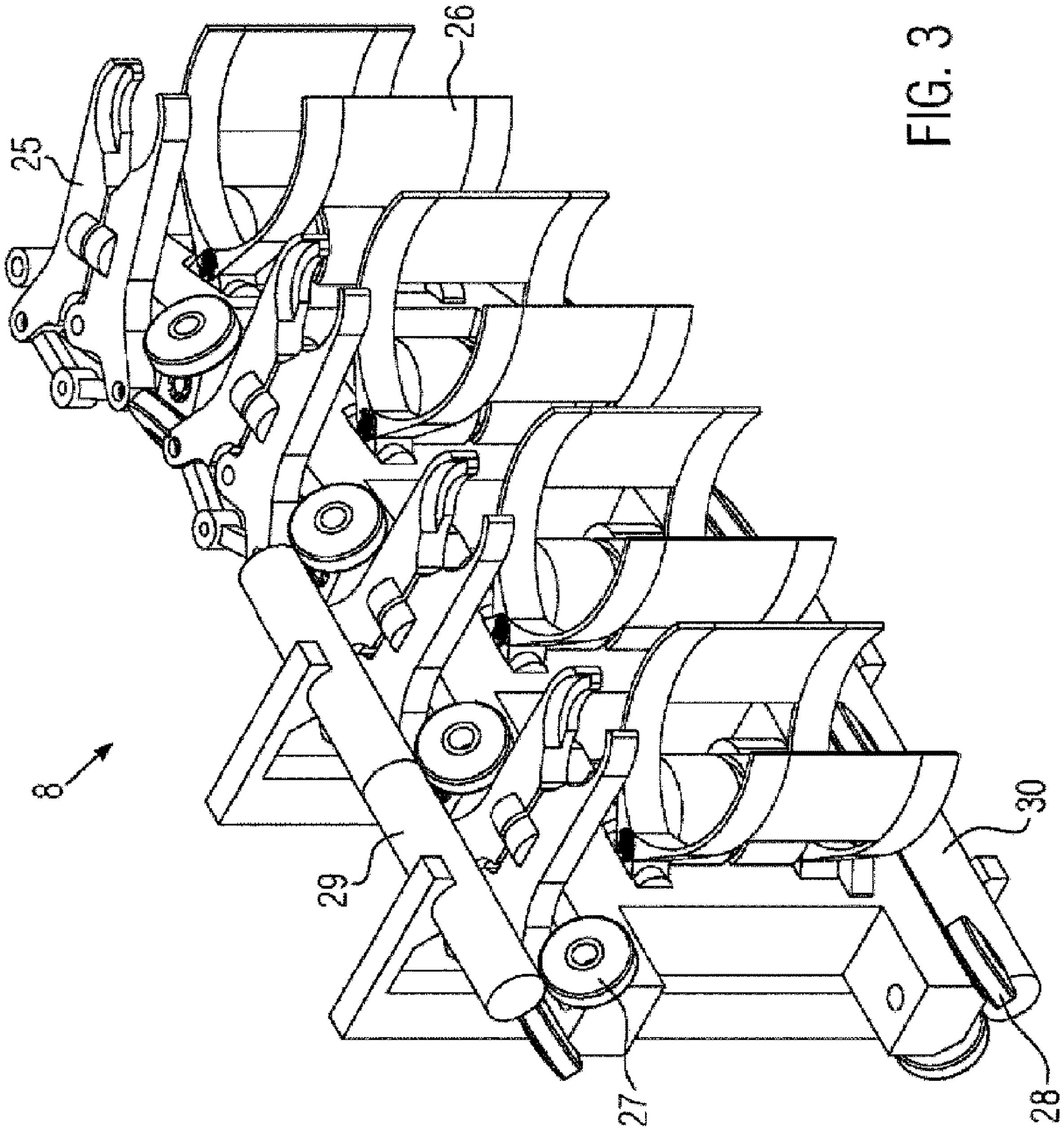
FIG. 3 shows a transport chain with neck clamps and body clamps running along the transport path.

FIG. 3 illustrates an embodiment of the transport path 8 in the form of a continuously circulating transport means 24 with holders 25 and body clamps 26 attached thereto for, in particular, passive gripping of the bottles 12.

The transport means 24, neck clamps 25 and body clamps 26 are preferably designed for transporting the bottles 12 aloft.

The endless transport means 24 can be designed, for example, as a roller-guided transport chain. Accordingly, upper and lower guide rollers 27, 28 can be arranged on the transport chain, which run along stationary upper and lower guide rails 29, 30. This is shown in FIG. 3 only for a short section of the transport path 8.

FIG. 1 further shows that the machine block 1 can comprise further handling and/or inspection units known per se. Accordingly, the machine block 1 comprises, for example, a blow molder 31, a labeling machine 32 arranged between it and the fillers 2, 5, an inspection unit 33 for inspecting the filled and closed bottles 12, a discharge belt 34 for properly filled and closed bottles 12 and a reject belt 35 for bottles 12 which are recognized as defective.

However, it would also be conceivable to distribute the bottles 12 after the blow molder 31 (prior to labeling) as described to two fillers 2, 5, and to label them only after closing, i.e. arrange a labeling machine 32 after the closer 9.

The endless transport means 24, which is also schematically shown in FIG. 1, preferably runs around the closer 9 and can be driven thereby, for example.

The linear transport path 8 can then be designed as a filling-side run **24*a* of the transport means 24. The inspection unit 33, the discharge belt 34 and the reject belt 35 can be arranged in the region of a return-side run 24*b* of the transport means 24**.

The reject belt 35 can run, for example, directly under the return-side run **24*b* and extend back into the region of the inspection unit 33; the discharge belt 34 can branch off therefrom at a reject shunt 36**.

This enables an overall compact arrangement as well as a comparatively simple design and synchronization of the drive technology in the machine block 1.

When the machine block 1 is working, the empty bottles 12 are produced as an equidistant bottle flow in the blow molder 31 and subsequently fed via (unspecified) transfer starwheels, infeed starwheels and outfeed starwheels to the labeling machine 32 and labeled therein. Subsequently, the bottles 12 are transferred to the transport path 8 where they are transported in succession as an equidistant bottle stream with the third transport spacing first into the region of the first filler 2 and then into the region of the second filler 5.

Only bottles 12 with an odd transport position are filled at the first filler 2, and only bottles 12 with an even transport position are filled in the second filler 5, or vice versa.

For this purpose, transport gaps 20 are temporarily created at every second transport position of the bottle stream and occupied again with bottles 12 filled there while still in the region of the same filler 2, 5. This means that transport gaps 20 arising at the first infeed starwheel 3 are occupied by filled bottles 12 at the first outfeed starwheel 4, and transport gaps 20 arising at the second infeed starwheel 6 are occupied by filled bottles 12 at the second outfeed starwheel 7.

Downstream from the second outfeed starwheel 7, an again equidistant bottle flow preferably runs in a continuous linear transport direction 10 into the region of the closer 9, preferably with intermediate treatment of the head space of the bottles 12 with inert gas at the inert gas dropper 11.

The filled bottles 12 are closed on the closer 9 by caps (not shown) provided by a pick wheel **9*a* of the closer 9 and subsequently inspected in the region of the returning run 24*b* of the transport means 24 in the inspection unit 33. For this purpose, the bottles can be transferred beforehand to the reject belt 35 or, if necessary, to the discharge belt 34 and, while standing thereupon, conveyed through the inspection unit 33. Bottles 12 identified therein as correct are routed to the discharge belt 34, while bottles 12 identified as defective remain on the reject belt 35. There, the defective bottles 12** can be removed in a manner known per se in order to either dispose of them or, if necessary, to subject them to rectification.

By transferring the empty bottles 12 to the first and second fillers 2, 5 sequentially as viewed in the direction of transport 10, and then immediately returning the filled bottles 12 to the resulting transport gaps 20 in the region of the linear transport sections **8*a*, 8*b* of the transport path 8, relatively high machine outputs of over 80,000 bottles per hour can be achieved with a comparatively compact design of the machine block 1** and relatively simple drive technology.

The fillers 2, 5 on the one hand, and the associated infeed starwheels 3, 6 and outfeed starwheels 4, 7 on the other hand, can always be designed in the same way, which allows the construction of the machine block 1 in the region of the fillers 2, 5 and the transport path 8 to be simplified. The drive of the transport path 8 or of its continuously circulating transport means 24 can also be coupled and/or synchronized in a comparatively simple manner to the drive of the filler 9 and/or the infeed starwheels 3, 6 and/or outfeed starwheels 4, 7.

The bottles 12 are preferably plastic bottles, in particular those made of PET, produced in the blow molder 31. The bottles 12 could be filled with the liquid product in the fillers 2, 5 both before their labeling and after their labeling. In principle, different filling materials can be processed in this case. Filling bottles 12 with uncarbonated water is particularly suitable for the output range of at least 80,000 containers per hour.

The method can also be used for CSD beverages. It would then also be conceivable for the two fillers 2, 5 to add different products. Thus, two types can be produced simultaneously with the machine block 1, but with a correspondingly reduced output in each case.

The invention claimed is:

1. A machine block for filling bottles with liquid products, comprising at least a first filler of a circulating design having a first infeed starwheel and a first outfeed starwheel and a second filler of a circulating design having a second infeed starwheel and a second outfeed starwheel, and further comprising a transport path for the bottles which runs linearly along the first and second infeed and outfeed starwheels, wherein the first and second infeed starwheels are designed, viewed in a transport direction, to alternatingly take the bottles from the transport path, and wherein the first and second outfeed starwheels are designed to return the bottles filled on the associated first or second filler to the transport path into transport gaps produced while being taken by the associated first or second infeed starwheel.

2. The machine block according to claim 1, wherein the axes of rotation of all the infeed starwheels and the outfeed starwheels are arranged along a straight line running parallel to the transport path.

3. The machine block according to claim 1, wherein the infeed and outfeed starwheels comprise bottle clamps that are extendable and/or pivotable, in a controlled manner, between an inner pitch circle and an outer pitch circle.

4. The machine block according to claim 3, wherein the bottle clamps are movably arranged such that a respective transport spacing between the bottles on the outer pitch circle is twice as large as on the inner pitch circle.

5. The machine block according to claim 4, wherein the bottle clamps are movably arranged such that the transport spacing of the bottles on the outer pitch circle is twice as large as on the inner pitch circle.

6. The machine block according to claim 1, wherein the transport path comprises a revolving transport means that runs continuously along the infeed starwheels and the outfeed starwheels.

7. The machine block according to claim 1, wherein the transport path comprises a revolving transport means on which neck clamps for a neck region of the bottles and body clamps for a body region of the bottles revolve.

8. The machine block according to claim 1, further comprising a closer which is interlocked with the fillers and is connected to the second outfeed starwheel downstream thereof by means of a linear transport section of the transport path in such a way that the transport path tangentially adjoins a pitch circle of the outfeed starwheel and a pitch circle of the closer, and with an inert gas dropper arranged in the linear transport section.

9. The machine block of claim 1 wherein the liquid products are beverages.

10. A method for filling bottles with liquid products, wherein the empty bottles are alternatingly taken from a transport path: at a first linear transport section by a first infeed starwheel and transferred to first filler of a circulating design that interlocks with the transport path; and at a second linear transport section following in a transport direction by a second infeed starwheel and transferred to a second filler of a circulating design that interlocks with the transport path, wherein the bottles filled in the first filler are returned to the transport path by means of a first outfeed starwheel by placing the bottles in transport gaps produced between the bottles in the first infeed starwheel, and wherein the bottles filled in the second filler are returned to the transport path by means of a second outfeed starwheel by placing the bottles in transport gaps produced between the bottles in the second infeed starwheel.

11. The method according to claim 10, wherein the bottles are transported on the transport path always in a single lane, and between the first and second filler as a mixed bottle stream with empty and filled bottles.

12. The method according to claim 10, wherein bottle clamps formed on the first and second infeed and outfeed starwheels are moved back and forth in a controlled manner between an inner pitch circle in the region of the respective filler and an outer pitch circle for taking/returning the bottles on the transport path.

13. The method according to claim 12, wherein the bottle clamps for taking/returning the bottles on the transport path are moved in a controlled manner along a movement path offset outwardly with respect to the inner pitch circle, so that a transport spacing between the bottle clamps there is twice as large as a transport spacing of the transport path.

14. The method according to claim 12, wherein the bottles are held aloft in the region of the transport path.

15. The method according to claim 10, wherein the bottles are consistently transported linearly between the second outfeed starwheel and a downstream closer, and the headspaces of the bottles are thereby exposed to inert gas.

16. The method according to claim 10, wherein at least 80,000 bottles per hour are transported on the transport path.

17. The method according to claim 14 wherein the bottles are held aloft in both in neck regions and in the body regions of the bottles.

18. The method according to claim 10 wherein the liquid products are beverages.

* * * * *